US012686446B2

(12) United States Patent
Kim et al.

(10) Patent No.: US 12,686,446 B2
(45) Date of Patent: Jul. 21, 2026

(54) APPARATUS FOR IMPROVING AERODYNAMIC PERFORMANCE OF A VEHICLE AND A CONTROL METHOD THEREOF

(71) Applicants: HYUNDAI MOTOR COMPANY, Seoul (KR); KIA CORPORATION, Seoul (KR)

(72) Inventors: Hak-Lim Kim, Yongin-si (KR); Dong-Bum Kim, Incheon (KR); Tae-Hyung Kim, Incheon (KR); Jeong-Bok Lee, Gyeongsan-si (KR); Bo-Hwan Cha, Gyeongsan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 347 days.

(21) Appl. No.: 18/237,779

(22) Filed: Aug. 24, 2023

(65) Prior Publication Data

US 2024/0217596 A1 Jul. 4, 2024

(30) Foreign Application Priority Data

Jan. 3, 2023 (KR) ........................ 10-2023-0000726

(51) Int. Cl.
 *B62D 35/00* (2006.01)
 *B62D 35/02* (2006.01)
 *B62D 37/02* (2006.01)
(52) U.S. Cl.
 CPC ........... *B62D 35/005* (2013.01); *B62D 35/02* (2013.01); *B62D 37/02* (2013.01)

(58) Field of Classification Search
 CPC ...... B62D 35/005; B62D 35/02; B62D 37/02; Y02T 10/82
 USPC ............................................ 296/180.1, 180.5
 See application file for complete search history.

(56) References Cited

U.S. PATENT DOCUMENTS

| | | | |
|---|---|---|---|
| 9,950,754 B2 | 4/2018 | Povinelli et al. | |
| 10,377,428 B2 | 8/2019 | Povinelli et al. | |
| 10,435,084 B2 | 10/2019 | Povinelli et al. | |
| 10,906,598 B2 | 2/2021 | Povinelli et al. | |
| 11,584,452 B2 | 2/2023 | Povinelli et al. | |
| 2008/0315622 A1* | 12/2008 | Oda ...................... | B62D 37/02 296/180.1 |
| 2010/0140976 A1* | 6/2010 | Browne ............... | B62D 35/005 296/180.1 |

(Continued)

FOREIGN PATENT DOCUMENTS

KR 20170023945 A 3/2017

*Primary Examiner* — Gregory A Blankenship
(74) *Attorney, Agent, or Firm* — Lempia Summerfield Katz LLC

(57) ABSTRACT

The present disclosure relates to an apparatus for improving aerodynamic performance of a vehicle and a control method thereof. The apparatus is accommodated or deployed to control a flow of air around a wheel of the vehicle while the vehicle is driving. A housing is fastened to the bottom of the vehicle at a position in front of the wheel. A first flap is hinge-connected to the housing. A second flap is hinge-connected to the first flap and is movable in parallel to the bottom of the vehicle. A drive part moves the other end of the second flap. In response to the operation of the drive part, the first flap and the second flap are accommodated or deployed to control the flow of air around the wheel.

15 Claims, 17 Drawing Sheets

(56)         References Cited

U.S. PATENT DOCUMENTS

| | | | | |
|---|---|---|---|---|
| 2017/0106922 A1 | | 4/2017 | Povinelli et al. | |
| 2018/0093716 A1 | | 4/2018 | Povinelli et al. | |
| 2018/0201332 A1 | | 7/2018 | Povinelli et al. | |
| 2019/0168826 A1* | | 6/2019 | Wolf | B62D 35/005 |
| 2019/0382060 A1 | | 12/2019 | Povinelli et al. | |
| 2020/0130756 A1* | | 4/2020 | Kim | B62D 25/18 |
| 2020/0239087 A1* | | 7/2020 | Nakamura | B62D 37/02 |
| 2021/0114671 A1 | | 4/2021 | Povinelli et al. | |
| 2023/0099045 A1* | | 3/2023 | Ando | B62D 35/02 |
| | | | | 296/180.5 |
| 2023/0103296 A1* | | 4/2023 | Kim | B62D 37/02 |
| | | | | 296/180.1 |
| 2023/0182831 A1* | | 6/2023 | Lee | B62D 35/008 |
| | | | | 296/180.5 |
| 2023/0339553 A1* | | 10/2023 | Yoon | B62D 37/02 |
| 2024/0034421 A1* | | 2/2024 | Arnold | B62D 35/02 |
| 2024/0051625 A1* | | 2/2024 | Nakayama | B62D 37/02 |
| 2024/0217596 A1* | | 7/2024 | Kim | B62D 37/02 |
| 2024/0383546 A1* | | 11/2024 | Saito | B62D 35/005 |
| 2025/0115310 A1* | | 4/2025 | Honma | B62D 35/02 |

* cited by examiner

Vehicle Speed

FIG. 13

APPARATUS FOR IMPROVING AERODYNAMIC PERFORMANCE OF A VEHICLE AND A CONTROL METHOD THEREOF

CROSS-REFERENCE TO RELATED APPLICATION

This application claims under 35 U.S.C. § 119(a) the benefit of priority to Korean Patent Application No. 10-2023-0000726 filed on Jan. 3, 2023, the entire contents of which are incorporated herein by reference.

BACKGROUND

(a) Technical Field

The present disclosure relates to an apparatus for improving aerodynamic performance of a vehicle and a control method thereof to control a flow of air around a wheel of the vehicle while the vehicle is driving.

(b) Background Art

While a vehicle is driving, a flow of air around a vehicle acts as air resistance to the driving of the vehicle.

As a method for reducing such air resistance, an air flow control apparatus has been disposed in front of a wheel or a tire of a vehicle to control the flow of air around the wheel. For example, as illustrated in FIG. 1, a plate-shaped deflector 131 is disposed in front of the wheel 111 to prevent air flow from entering a wheel housing in which the wheel 111 is disposed in order to reduce the air resistance. However, there are problems in that not only is the air resistance of the deflector 131 significant, but also a significant amount of turbulence occurs around the wheel 111.

As illustrated in FIG. 2, a wheel strake 132 having a three-dimensional shape has been used to reduce the air resistance of the wheel strake 132 and turbulence around the wheel 111. However, the wheel strake 132 may be damaged due to interference with the ground as the size thereof increases. In addition, the wheel strake 132 is disposed on the vehicle in an extendable manner so as to be deployed from, or accommodated in, the vehicle depending on the driving speed. Since a space in which the wheel strake 132 is to be accommodated should be provided inside the vehicle, it is disadvantageous in terms of packaging. When the wheel strake 132 is deployed, foreign matters may enter the inside of the vehicle, thereby causing the wheel strake 132 to malfunction.

SUMMARY OF THE DISCLOSURE

The present disclosure has been made in an effort to solve the above-described problems associated with the related art. An object of the present disclosure is to provide an apparatus for improving aerodynamic performance of a vehicle and a control method thereof, the apparatus being disposed on a bottom of the vehicle and configured to be deployed toward the ground depending on a speed of the vehicle to cover or block a front portion of a wheel and then to control an air flow around the wheel.

In one aspect, the present disclosure provides an apparatus for improving aerodynamic performance of a vehicle, the apparatus including: a housing fastened to a bottom of the vehicle at a position in front of a wheel of the vehicle; a first flap having one end hinge-connected to the housing; a second flap, one end thereof being hinge-connected to the other end of the first flap, and the other end thereof being movable in parallel to the bottom of the vehicle; and a drive part configured to move the other end of the second flap. In response to the operation of the drive part, the first flap and the second flap may be accommodated to be in contact with the bottom surface of the vehicle or deployed to cover a front portion of the wheel, with the other end of the first flap and one end of the second flap facing the ground.

The apparatus may further include a hinge assembly configured to hinge-connect the one end of the first flap to the bottom of the vehicle and hinge-connect the other end of the first flap and the one end of the second flap.

The hinge assembly may include: a fixed body fixed to the housing; a main body fastened to an upper surface of the first flap and hinge-connected to the fixed body; and a movable body fastened to an upper surface of the second flap and hinge-connected to the main body.

The hinge assembly may further include: a first hinge shaft hinge-connecting the fixed body and the main body; and a second hinge shaft hinge-connecting the main body and the movable body. When the first flap and the second flap are deployed, one end of the second hinge shaft may be movable downwardly away from the housing.

The first hinge shaft and the second hinge shaft may be disposed to extend and spread out in a direction to the rear of the vehicle.

The first flap may include: a first flap inner portion fastened to the main body; and a first flap outer portion fastened to an outer surface of the first flap inner portion, the first flap outer portion extending convexly away from the first flap inner portion. The second flap may include: a second flap inner portion fastened to the movable body; and a second flap outer portion fastened to an outer surface of the second flap inner portion, the second flap outer portion extending convexly away from the second flap inner portion.

The drive part may include: an actuator; and a plurality of power transmission members provided between a drive shaft of the actuator and the other end of the second flap to move the other end of the second flap in response to an operation of the actuator.

The power transmission members may include: a loader having one end connected to the drive shaft of the actuator, a coupler having one end hinge-connected to the other end of the loader, and a crank having one end hinge-connected to the housing. The crank is hinge-connected to the other end of the coupler and connected to the other end of the second flap.

The apparatus may further include a flap connector fastened to the second flap, wherein the flap connector is fastened to the crank.

The housing may have a through-hole through which the flap connector extends.

The apparatus may further include a sliding cover provided between the flap connector and the crank and covering the through-hole.

The housing may be mounted on a lower portion of each of both side ends of a front end module (FEM) carrier of the vehicle through a connector bracket.

The apparatus may further include a control part configured to control the operation of the drive part and control the first flap and the second flap to be accommodated or deployed.

The apparatus may further include flap operation lamps configured to be lit when the first flap and the second flap are deployed.

The apparatus may further include a manual mode lamp configured to be lit when the drive part operates in a manual mode.

Also provided is a control method of an apparatus for improving aerodynamic performance of a vehicle, the method including: a main switch determination step of determining, by a control part, whether or not a main switch is on; a manual mode switch determination step of determining, by the control part, whether or not a manual mode switch is on; an automatic mode start step of starting, by the control part, control in an automatic mode when the manual mode switch is off; a vehicle speed comparison step of comparing a vehicle speed of a vehicle input to the control part with a reference vehicle speed; and a flap control step of operating, by the control part, flaps depending on the vehicle speed.

The flap control step may include: a flap accommodation step of operating the flaps to be closer to the bottom of the vehicle; and a flap deployment step of deploying the flaps so that a front portion of a wheel is covered.

The vehicle speed comparison step may include: a first vehicle speed comparison step of comparing whether or not the vehicle speed is slower than an accommodation reference speed at which the flaps are set to be accommodated; and a second vehicle speed comparison step of comparing whether or not the vehicle speed is faster than a deployment reference speed at which the flaps are set to be deployed.

When the vehicle speed is slower than the accommodation reference speed in the first vehicle speed comparison step, the flap accommodation step may be performed, and when the vehicle speed is not slower than the accommodation reference speed in the first vehicle speed comparison step, the second vehicle speed comparison step may be performed.

After the flap accommodation step, the main switch determination step may be returned to (i.e., repeated).

When the vehicle speed is faster than the deployment reference speed in the second vehicle speed comparison step, the flap deployment step may be performed. When the vehicle speed is not faster than the deployment reference speed in the second vehicle speed comparison step, the main switch determination step may be returned to (i.e., repeated).

The deployment reference speed may be set to be greater than the accommodation reference speed.

The control part may light flap operation lamps in the flap deployment step.

The method may further include: a manual mode start step of starting, by the control part, control in a manual mode when the manual mode switch is on in the manual mode switch determination step; and an operation switch determination step of determining, by the control part, whether or not an operation switch for manually controlling the operation of the flaps is on. When the operation switch is on, the flap deployment step may be performed, and when the operation switch is off, the flap accommodation step may be performed.

The control part may light a manual mode lamp in the manual mode start step.

The method may further include an end preparation step of accommodating the flaps when the main switch is determined to be off in the main switch determination step.

According to the apparatus for improving aerodynamic performance of a vehicle and a control method thereof of the present disclosure, the first flap and the second flap are deployed toward the ground depending on the speed of the vehicle to control a flow of air around a wheel of the vehicle, thereby reducing air resistance around the wheel of the vehicle. Thus, the aerodynamic performance of the vehicle is improved.

In addition, since neither the first flap nor the second flap is disposed inside the vehicle and the sliding cover closes the through-hole, it is possible to prevent foreign matters from entering when the first flap and the second flap are operating.

Furthermore, since the first flap and the second flap are exposed to the outside instead of being disposed inside the vehicle, a space inside the vehicle for accommodating the first flap and the second flap is not necessary, and the first flap and the second flap may be easily replaced in case of failure.

BRIEF DESCRIPTION OF THE DRAWINGS

Figure 13:
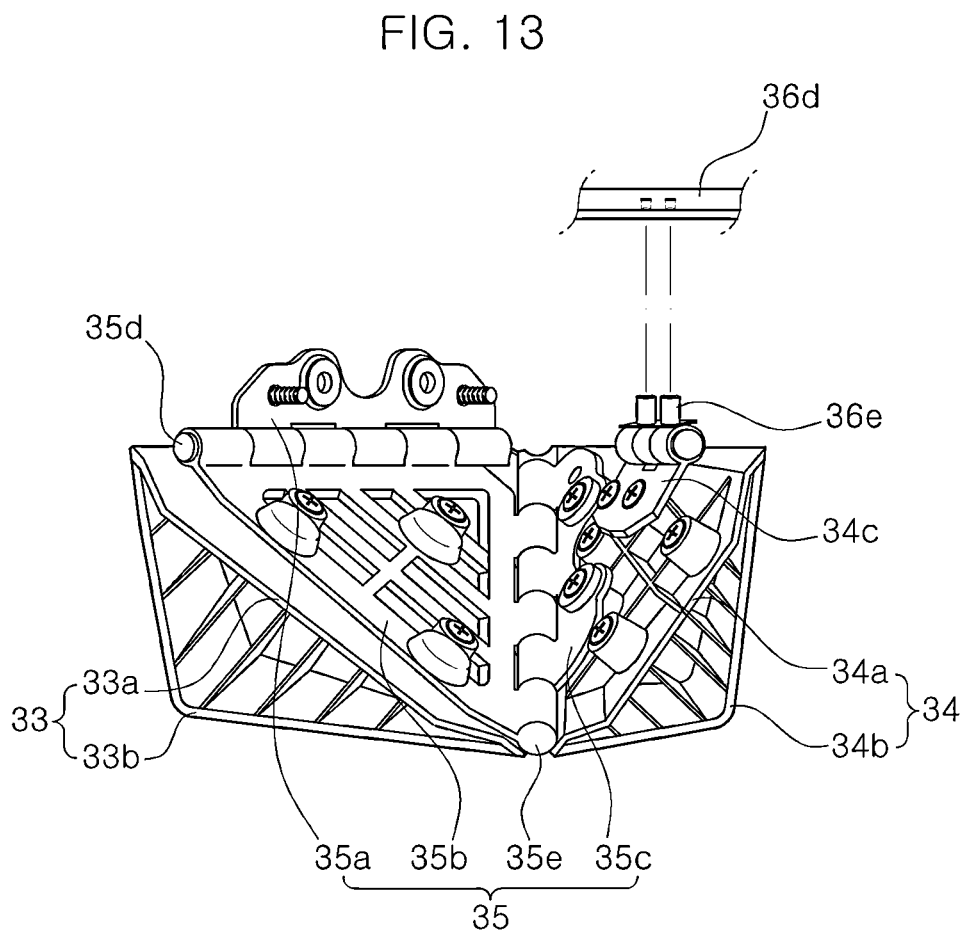

FIG. 13 is a rear perspective view illustrating the relationship of connection of the flaps, the hinge assembly, and the drive part of the apparatus according to one embodiment the present disclosure;

DETAILED DESCRIPTION

Figures 1, 2:
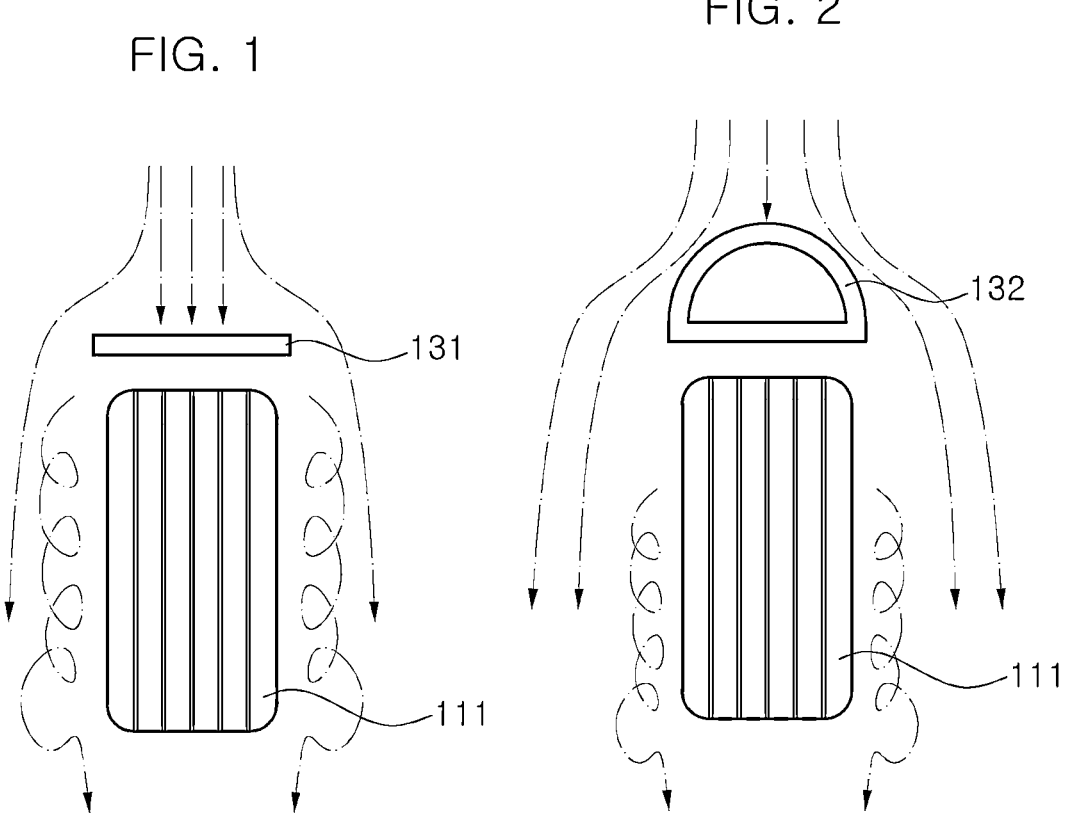
FIG. 1 is a schematic view illustrating a flow of air around a wheel of a vehicle in the related art in a state in which a deflector is disposed in front of the wheel.
FIG. 2 is a schematic view illustrating a flow of air around a wheel of a vehicle in the related art in a state in which a wheel strake is disposed in front of the wheel.
Figure 3:
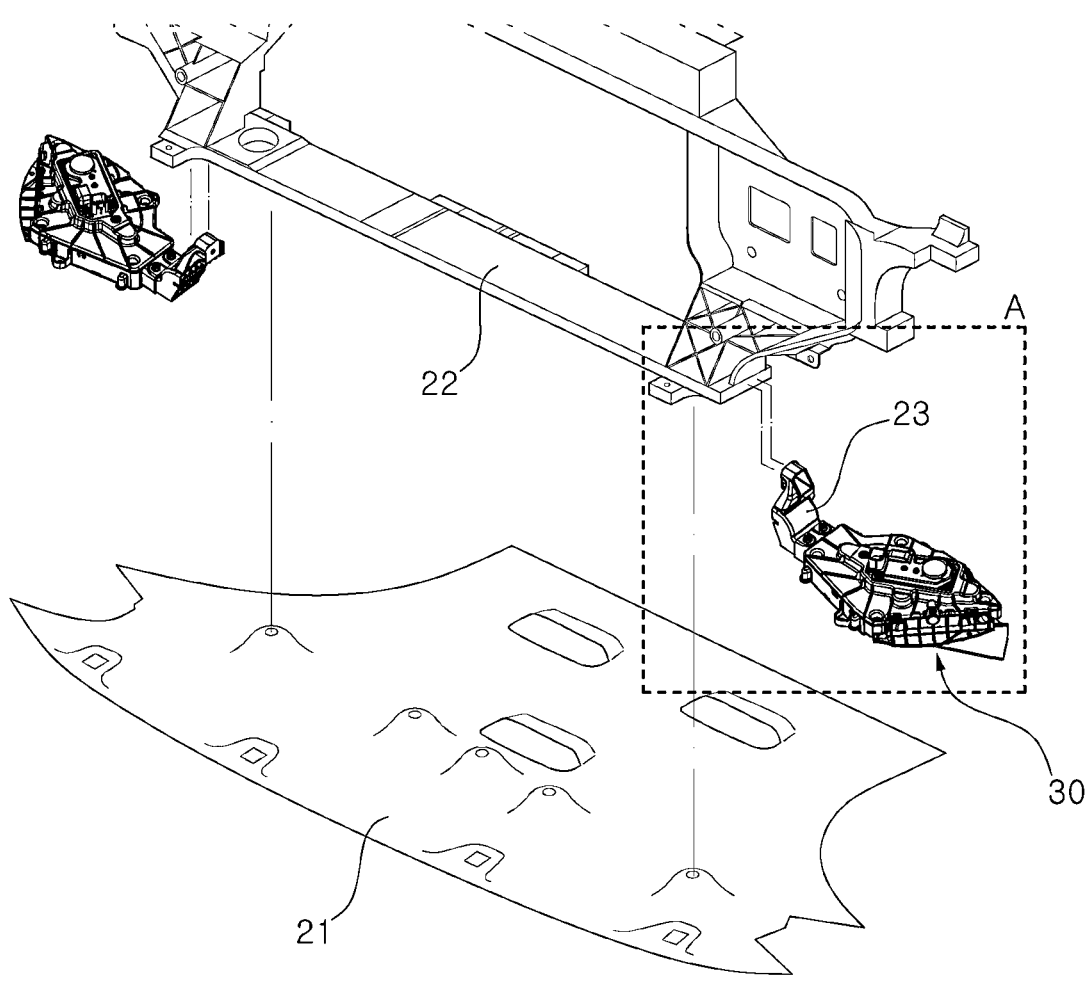
FIG. 3 is an exploded perspective view illustrating an apparatus for improving aerodynamic performance of a vehicle according to one embodiment of the present disclosure disposed at a front portion of a vehicle.

Hereinafter, an apparatus for improving aerodynamic performance of a vehicle and a control method thereof according to the present disclosure is described in detail with reference to the accompanying drawings.

The apparatus for improving aerodynamic performance of a vehicle according to one embodiment the present disclosure may include: a housing 31 fastened to the bottom of a vehicle in a position in front of a wheel 11 of the vehicle; a first flap 33 having one end (e.g., first end) hinge-connected to the housing 31; a second flap 34, one end (e.g., first end) thereof being hinge-connected to the other end (e.g., second end) of the first flap 33, and the other end (e.g., second end) thereof being movable in parallel to the bottom of the vehicle; and a drive part 36 configured to move the other end of the second flap 34. In response to the operation of the drive part 36, the first flap 33 and the second flap 34 may be accommodated (i.e., retracted, collapsed, or closed) to be in contact with the bottom surface of the vehicle or deployed (i.e., extended, expanded, or opened) to cover the front portion of the wheel 11, with the other end of the first flap 33 and one end of the second flap 34 facing the ground.

The housing 31 may be fastened to the bottom of the vehicle in a position in front of the wheel 11 of the vehicle.

The first flap 33 and the second flap 34 described below may be disposed on the bottom of the housing 31, and the drive part 36 configured to drive the first flap 33 and the second flap 34 may be mounted on the housing 31.

The housing 31 may be mounted on the lower portion of each of both side ends of a carrier 22 of a front end module (FEM) of the vehicle on which a bumper 12 and an engine room undercover 21 may be mounted through a connector bracket 23.

The engine room undercover 21 of the vehicle may be mounted on the bottom of the FEM carrier 22. The engine room undercover 21 and the housing 31 may be disposed at similar heights (i.e., distance from the ground). The apparatus 30 for improving aerodynamic performance of a vehicle may be disposed on the bottom of the vehicle.

A cover 32 may be provided on top of the housing 31 to cover the housing 31.

The first flap 33 and the second flap 34 may be accommodated (i.e., retracted, collapsed, or closed) to be in contact with the bottom of the vehicle in a situation in which aerodynamic control is not necessary. When aerodynamic control is necessary, the first flap 33 and the second flap 34 may be deployed (i.e., extended, expanded, or opened) to be convex toward the ground to cover the front portion of the wheel 11 of the vehicle, thereby controlling a flow of air around the wheel 11. Hereinafter, the state in which the first flap 33 and the second flap 34 are in contact with the bottom of the vehicle (since aerodynamic control is not necessary) is referred to as the "accommodated" (or "retracted" or "collapsed" or "closed") state, while the state in which the first flap 33 and the second flap 34 are deployed to be convex toward the ground (since aerodynamic control is necessary) is referred to as the "deployed" (or "extended" or "expanded" or "opened") state.

Since the height h2 of the lower end of the first flap 33 or the second flap 34 from the bottom of the housing 31 in the deployed state is higher than the height h1 of the lower end of the first flap 33 or the second flap 34 from the bottom of the housing 31 in the accommodated state, the length of protrusion of the first flap 33 or the second flap 34 toward the ground may be increased. Thus, the first flap 33 or the second flap 34 controls the flow of air in front of the wheel 11.

One end (i.e., a first end) of the first flap 33 may be hinge-connected to the housing 31.

One end (i.e., a first end) of the second flap 34 may be hinge-connected to the other end (i.e., a second end) of the first flap 33, and the other end (i.e., a second end) of the second flap 34 moves in parallel to the bottom of the vehicle.

When the first flap 33 and the second flap 34 are converted into the deployed state to be closer to the ground from the accommodated state, in which the other end of the first flap 33 and the one end of the second flap 34 are in contact with the bottom of the housing 31, the first flap 33 and the second flap 34 cover the front portion of the wheel 11 to control the flow of air around the wheel 11.

When the first flap 33 and the second flap 34 are deployed, the first flap 33 and the second flap 34 may have a downwardly convex shape so that a three-dimensional structure is formed by the first flap 33 and the second flap 34.

The first flap 33 includes a first flap inner portion 33a and a first flap outer portion 33b fastened to an outer surface of the first flap inner portion 33a. The first flap outer portion 33b is formed convexly away (i.e., arched or bent outwardly away) from the first flap inner portion 33a toward the ground in the accommodated state. The second flap 34 also includes a second flap inner portion 34a and a second flap outer portion 34b fastened to an outer surface of the second flap inner portion 34a. The second flap outer portion 34b is also formed convexly toward the ground in the accommodated state, similar to that of the first flap outer portion 33b.

The first flap inner portion 33a and the second flap inner portion 34a allow the first flap 33 and the second flap 34 to be hinge-connected, thereby allowing the first flap 33 and the second flap 34 to be accommodated or deployed.

The first flap outer portion 33b and the second flap outer portion 34b form an outer shape of the first flap 33 and the second flap 34. Thus, when the first flap 33 and the second flap 34 are deployed, the first flap outer 33b and the second flap outer 34b control the flow of air directed to the wheel 11.

A hinge assembly 35 allows the first flap 33 and the second flap 34 to be accommodated or deployed. In other words, the hinge assembly 35 hinge-connects one end of the first flap 33 to the housing 31 and hinge-connects the other end of the first flap 33 and one end of the second flap 34.

In this regard, the hinge assembly 35 includes a fixed body 35a fixed to the housing 31, a main body 35b fastened to the upper surface of the first flap 33 and hinge-connected to the fixed body 35a, and a movable body 35c fastened to the upper surface of the second flap 34 and hinge-connected to the main body 35b. Since the first flap 33 and the second flap 34 include the first flap inner portion 33a and the second flap inner portion 34a, respectively, the main body 35b and the movable body 35c may be fastened to the first flap inner portion 33a and the second flap inner portion 34a.

The fixed body 35a and the main body 35b may be hinge-connected through a first hinge shaft 35d, while the main body 35b and the movable body 35c are hinge-connected through a second hinge shaft 35e.

In particular, the first hinge shaft 35*d* and the second hinge shaft 35*e* may be disposed to extend and spread out from one another in the direction from the front to the rear of the vehicle. The first hinge shaft 35*d* and the second hinge shaft 35*e* may be disposed in a shape such that the front ends (i.e., ends toward the front of the vehicle) converge. The first flap 33 and the second flap 34 rotate about the first hinge shaft 35*d* and the second hinge shaft 35*e*, respectively.

FIGS. 5-8 illustrate the accommodated state of the first flap 33 and the second flap 34. In the accommodated state of the first flap 33 and the second flap 34, the height h1 of the lower ends of the first flap 33 and the second flap 34 protruding toward the ground may be not significant. Thus, the first flap 33 and the second flap 34 fail to substantially control the flow of air directed to the wheel 11.

FIGS. 9-12 illustrate the deployed state of the first flap 33 and the second flap 34. When the first flap 33 and the second flap 34 are deployed, the height h1 of the lower ends of the first flap 33 and the second flap 34 protruding toward the ground increases. Thus, the first flap 33 and the second flap 34 control the flow of air directed to the wheel 11, thereby improving aerodynamic performance.

The drive part 36 moves the other end of the second flap 34. The drive part 36 may be disposed to push or pull the other end of the second flap 34, and thus moves the other end of the second flap 34.

In response to the movement of the other end of the second flap 34, the first flap 33 and the second flap 34 may be deployed from the accommodated state or operate in the opposite manner (i.e., retract, collapse, or close into the accommodated state from the deployed state).

The drive part 36 includes an actuator 36*a* and a plurality of power transmission members provided between a drive shaft 36*aa* of the actuator 36*a* and the other end of the second flap 34 to move the other end of the second flap 34 in response to the operation of the actuator 36*a*.

When power is applied to the actuator 36*a*, the actuator 36*a* generates an operating force. For example, the actuator 36*a* may be implemented as a drive motor that generates rotational force through the drive shaft 36*aa* of the actuator 36*a* when power is applied thereto.

The power transmission members may be disposed between the actuator 36*a* and the other end of the second flap 34 to operate to push or pull the other end of the second flap 34 in response to the operation of the actuator 36*a*. As an example of the power transmission members, the power transmission members may include a loader 36*b* having one end connected to the drive shaft 36*aa* of the actuator 36*a*, a coupler 36*c* having one end hinge-connected to the other end of the loader 36*b*, and a crank 36*d* having one end hinge-connected to the housing 31. The crank 36*d* may be hinge-connected to the other end of the coupler 36*c* and connected to the other end of the second flap 34. The loader 36*b*, the coupler 36*c*, and the crank 36*d* may be referred to as links, arms, or shafts and may form a four-section link together with the housing 31, and may be configured such that the crank 36*d* rotates through the coupler 36*c* when the actuator 36*a* rotates the loader 36*b*.

The coupler 36*c* may be fastened to the second flap 34 through a flap connector 36*e*. A bracket 34*c* may be fastened to the second flap 34, and the bracket 34*c* and the flap connector 36*e* may be fastened to each other. Thus, the coupler 36*c* and the other end of the second flap 34 may be fastened to each other through the flap connector 36*e*. Consequently, in response to the rotation of the coupler 36*c*, the other end of the second flap 34 moves. As a result, the first flap 33 and the second flap 34 may be accommodated or deployed. In other words, when the crank 36*d* rotates (see an arrow (1) in FIG. 10) in response to the operation of the actuator 36*a*, the other end of the second flap 34 moves toward the first flap 33 (see an arrow 2 in FIG. 12). When the other end of the second flap 34 moves, one end of the second flap 34 rotates in a direction in contact with the other end of the first flap 33 (see an arrow 3 in FIG. 12), and the other end of the first flap 33 and one end of the second flap 34 may be rotated to further protrude toward the ground, and one end of the first flap 33 also rotates (see an arrow 4) in FIG. 12).

Although an example in which the drive part 36 is provided as a drive motor and the power transmission members are provided as links, such as the loader 36*b*, the coupler 36*c*, and the crank 36*d* as described hereinabove, the present disclosure is not limited thereto.

For example, the actuator 36*a* may be provided as a drive motor, and the drive shaft 36*aa* of the actuator 36*a* may be directly connected to one end of the crank 36*d*. When the actuator 36*a* operates, the actuator 36*a* directly rotates the crank 36*d* so that the other end of the second flap 34 moves.

Alternatively, when the actuator 36*a* is provided as a hydraulic cylinder or a pneumatic cylinder and connected to the other end of the second flap 34, the other end of the second flap 34 may move in response to the extension and contraction of the actuator 36*a*.

In addition, the drive part 36, i.e., the actuator 36*a*, the loader 36*b*, the coupler 36*c*, and the crank 36*d*, may be positioned on top of the housing 31, and the second flap 34 may be positioned underneath the housing 31. The housing 31 may have a through-hole 31*a* through which the crank 36*d* and the second flap 34 are fastened to each other. The through-hole 31*a* may be formed to include tracks of the flap connector 36*e* fastened to the crank 36*d* and the second flap 34, respectively. In other words, since the through-hole 31*a* is formed to be greater than the track of the flap connector 36*e*, the operation of the flap connector 36*e* may not be limited by the housing 31.

Foreign matter may enter the inside of the vehicle, i.e., the engine room of the vehicle, through the through-hole 31*a*. In order to prevent this problem, a sliding cover 37 may be provided (see FIGS. 14-17).

The sliding cover 37 may be fastened to the crank 36*d* and the flap connector 36*e*, and covers and closes the through-hole 31*a* irrespective of the position of the crank 36*d*. Even in the case that the crank 36*d* is rotated by the operation of the actuator 36*a*, the sliding cover 37 blocks foreign matter from entering through the through-hole 31*a*.

A control part 40 controls the operation of the apparatus 30 for improving aerodynamic performance of a vehicle according to the present disclosure. The control method described below may be stored as a logic in the control part 40. The first flap 33 and the second flap 34 may be accommodated or deployed by controlling the operation of the drive part 36.

Figure 4:
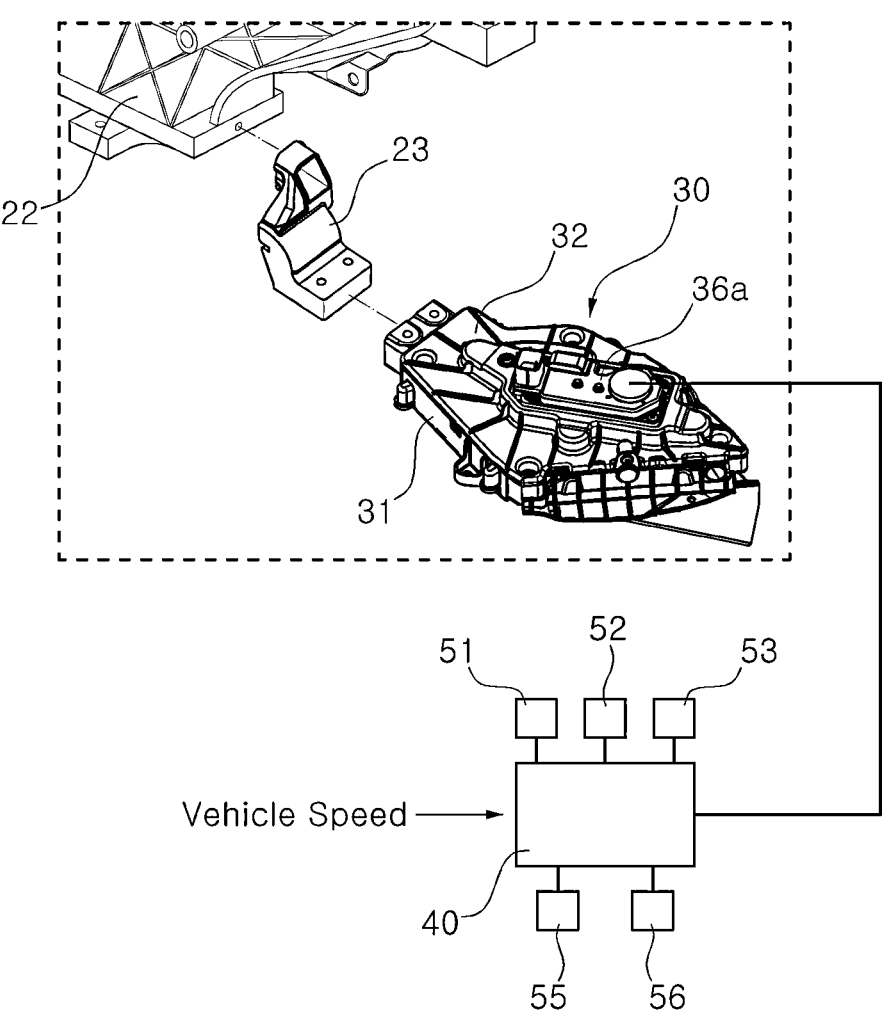
FIG. 4 is an enlarged view of region A in FIG. 3.
Figure 5:
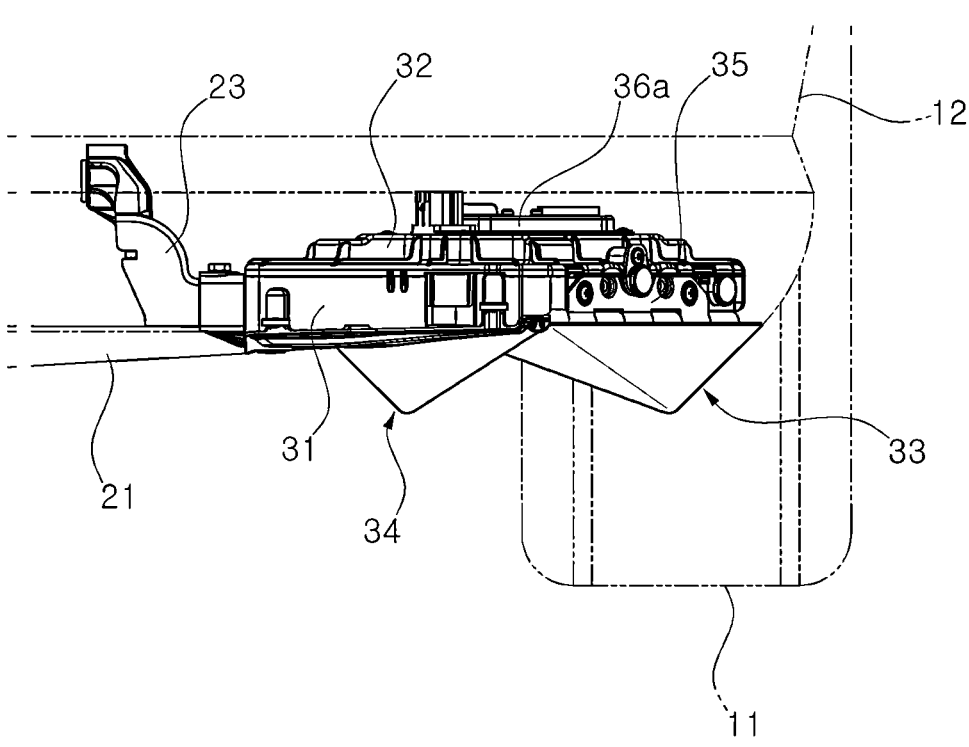
FIG. 5 is a front view illustrating a state before the flaps of the apparatus according to one embodiment the present disclosure are deployed, viewed from the front of the vehicle.
Figure 6:
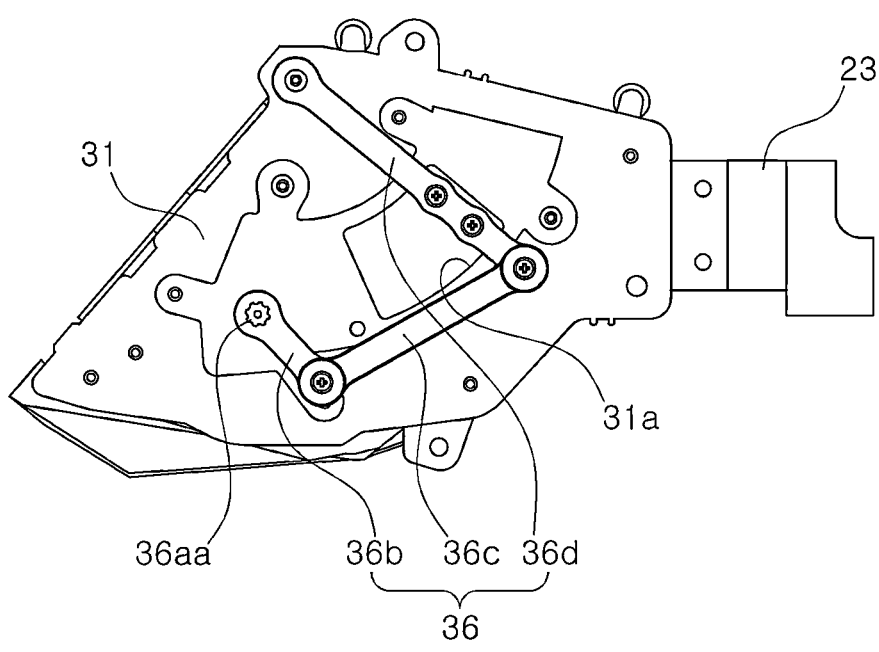
FIG. 6 is a plan view illustrating the state before the flaps of the apparatus according to one embodiment the present disclosure are deployed.
Figure 7:
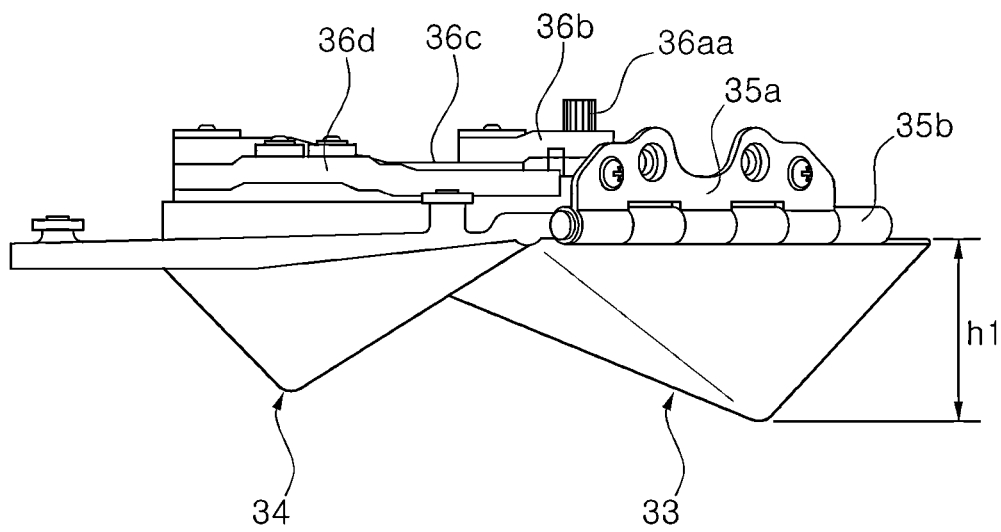
FIG. 7 is a front view illustrating the state before the flaps of the apparatus according to one embodiment the present disclosure are deployed.
Figure 8:
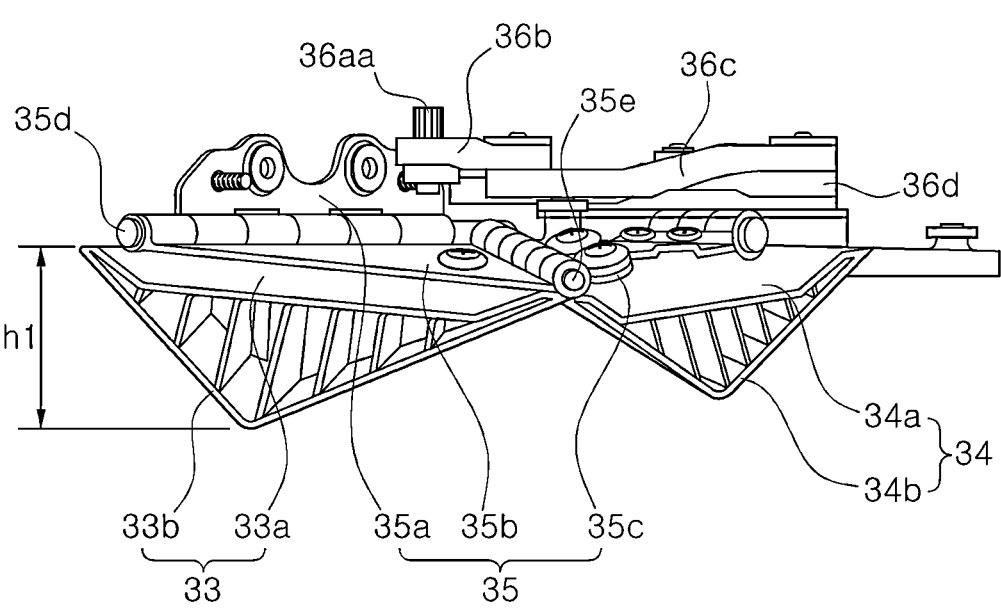
FIG. 8 is a rear view illustrating the state before the flaps of the apparatus according to one embodiment the present disclosure are deployed.
Figure 9:
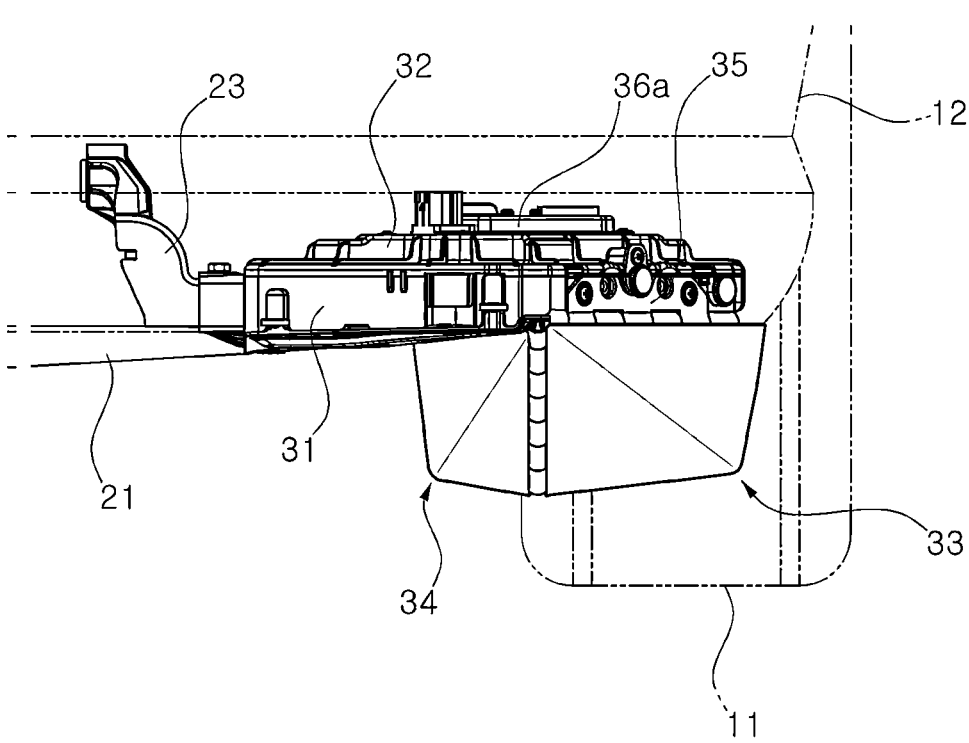
FIG. 9 is a front view illustrating a deployed state of the flaps of the apparatus according to one embodiment the present disclosure, viewed from front of the vehicle.
Figure 10:
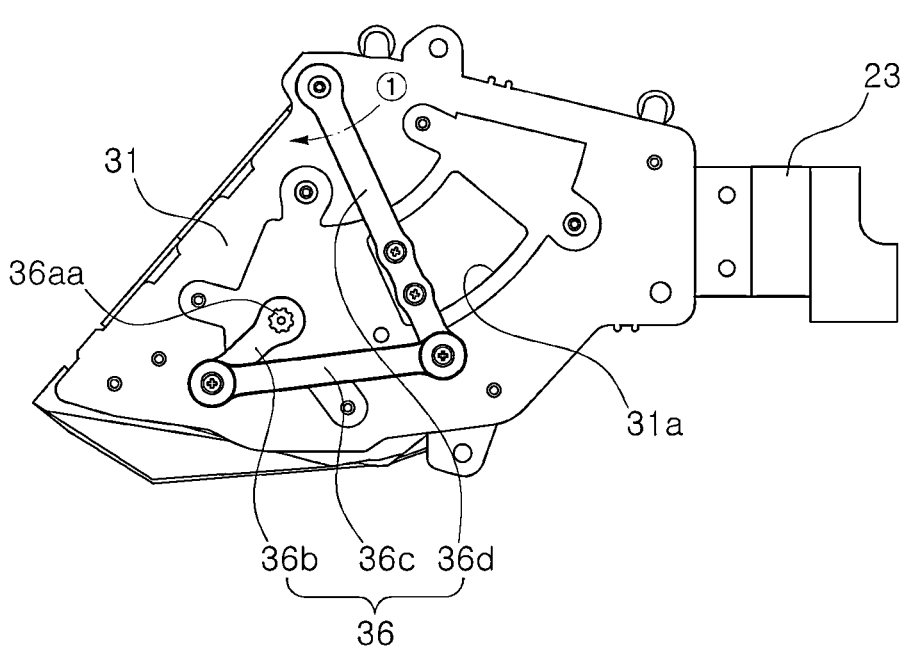
FIG. 10 is a plan view illustrating the deployed state of the flaps of the apparatus according to one embodiment the present disclosure.
Figure 11:
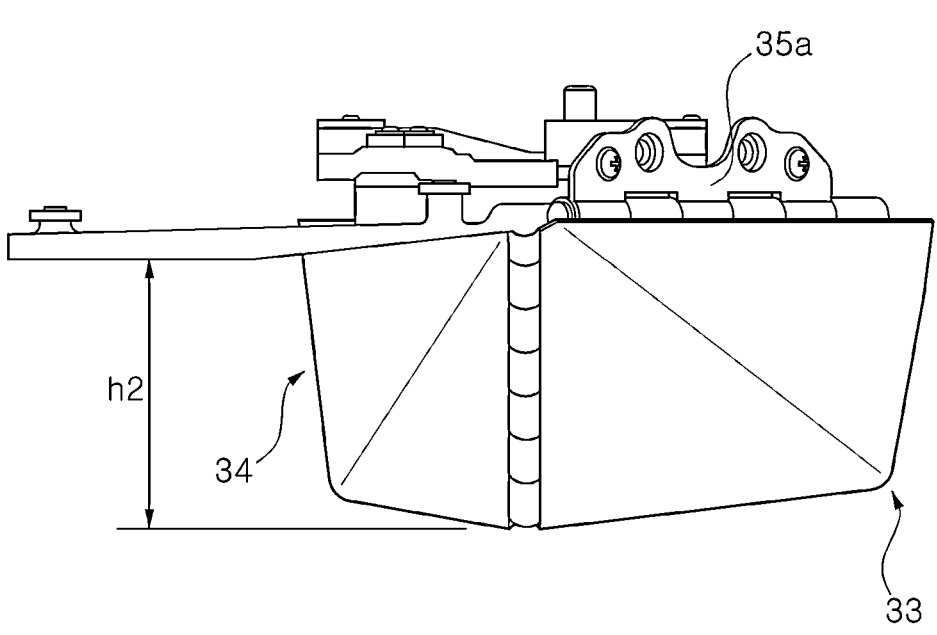
FIG. 11 is a front view illustrating the deployed state of the flaps of the apparatus according to one embodiment the present disclosure.
Figure 12:
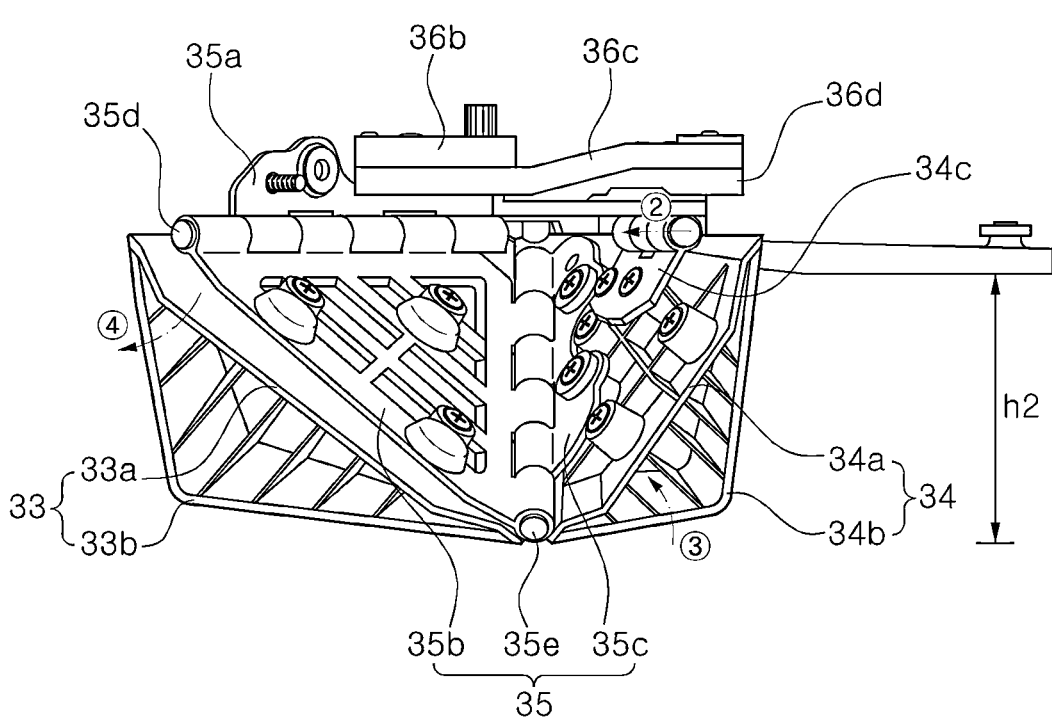
FIG. 12 is a rear view illustrating the deployed state of the flaps of the apparatus according to one embodiment the present disclosure.
Figure 14:
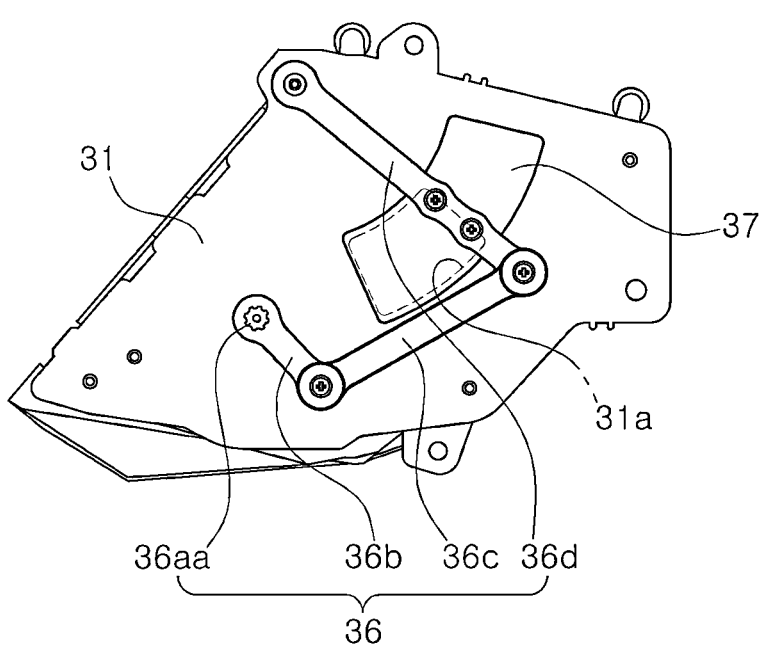
FIG. 14 is a plan view illustrating a state in which the sliding cover is disposed before the flaps are deployed in the apparatus according to the present disclosure.
Figure 15:
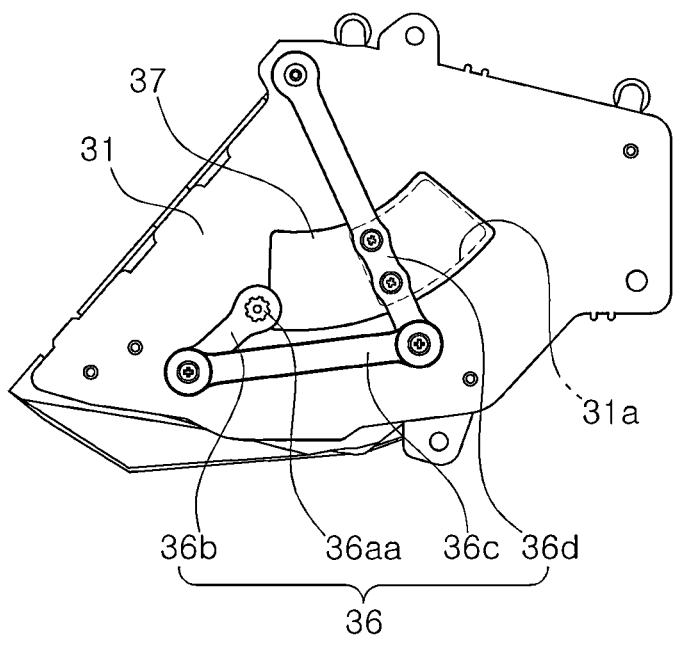
FIG. 15 is a plan view illustrating a state in which the sliding cover is disposed after the flaps are deployed in the apparatus for improving aerodynamic performance of a vehicle according to one embodiment the present disclosure.
Figure 16:
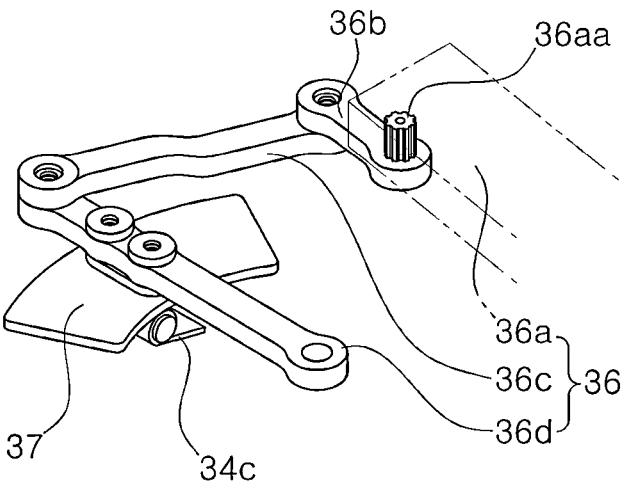
FIG. 16 is a perspective view illustrating the relationship of connection of the sliding cover and the drive part of the apparatus according to one embodiment the present disclosure.
Figure 17:
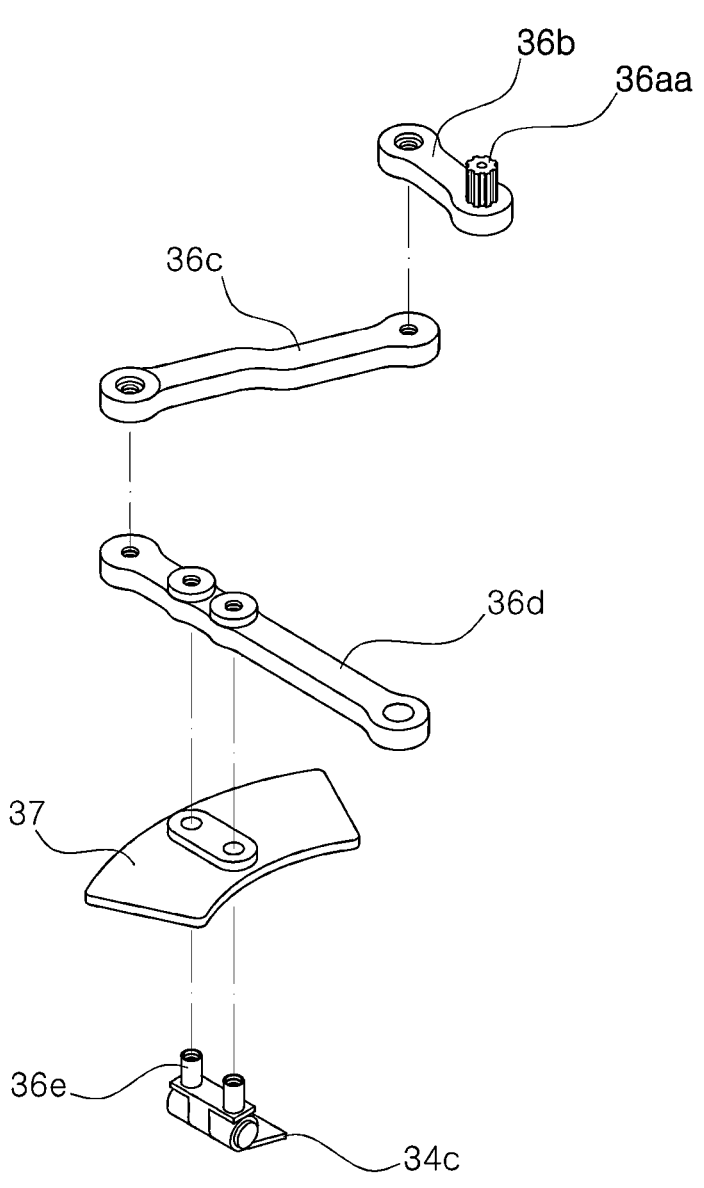
FIG. 17 is an exploded perspective view illustrating the relationship of connection of the sliding cover and the drive part of the apparatus according to one embodiment the present disclosure.

As shown in FIG. 4, a main switch 51 for activating the operation of the apparatus 30 for improving aerodynamic performance of a vehicle, a manual mode switch 52 for operating the apparatus 30 for improving aerodynamic performance of a vehicle in a manual mode, and an operation switch 53 for deploying the first flap 33 and the second flap 34 in the manual mode may be provided in the vehicle. The main switch 51, the manual mode switch 52, and the operation switch 53 may be connected to the control part 40.

When the operation of the apparatus 30 for improving aerodynamic performance of a vehicle is activated, the control part 40 controls the first flap 33 and the second flap 34 to be accommodated or deployed depending on a vehicle speed input to the control part 40 in an automatic mode. The control part 40 controls the first flap 33 and the second flap 34 to be accommodated or deployed by comparing the vehicle speed with a predetermined accommodation reference speed or a predetermined deployment reference speed. The control part 40 may control the first flap 33 and the second flap 34 by varying the degree of deployment according to the level of the vehicle speed. In the manual mode, when the operation switch 53 is turned on, the control part 40 controls the first flap 33 and the second flap 34 to be deployed. When the operation switch 53 is turned off, the control part 40 controls the first flap 33 and the second flap 34 to be accommodated.

In addition, a means for reviewing the status of the apparatus 30 for improving aerodynamic performance of a vehicle (for example, lamps 55 and 56) may be provided on side portions of the vehicle. In other words, the lamps 55 and 56 may include a manual mode lamp 55 for alarming the manual mode of the apparatus 30 for improving aerodynamic performance of a vehicle and a flap operation lamp 56 for alarming the deployment of the first flap 33 and the second flap 34. The manual mode lamp 55 and the flap operation lamp 56 may be lit by the control part 40.

Figure 18:
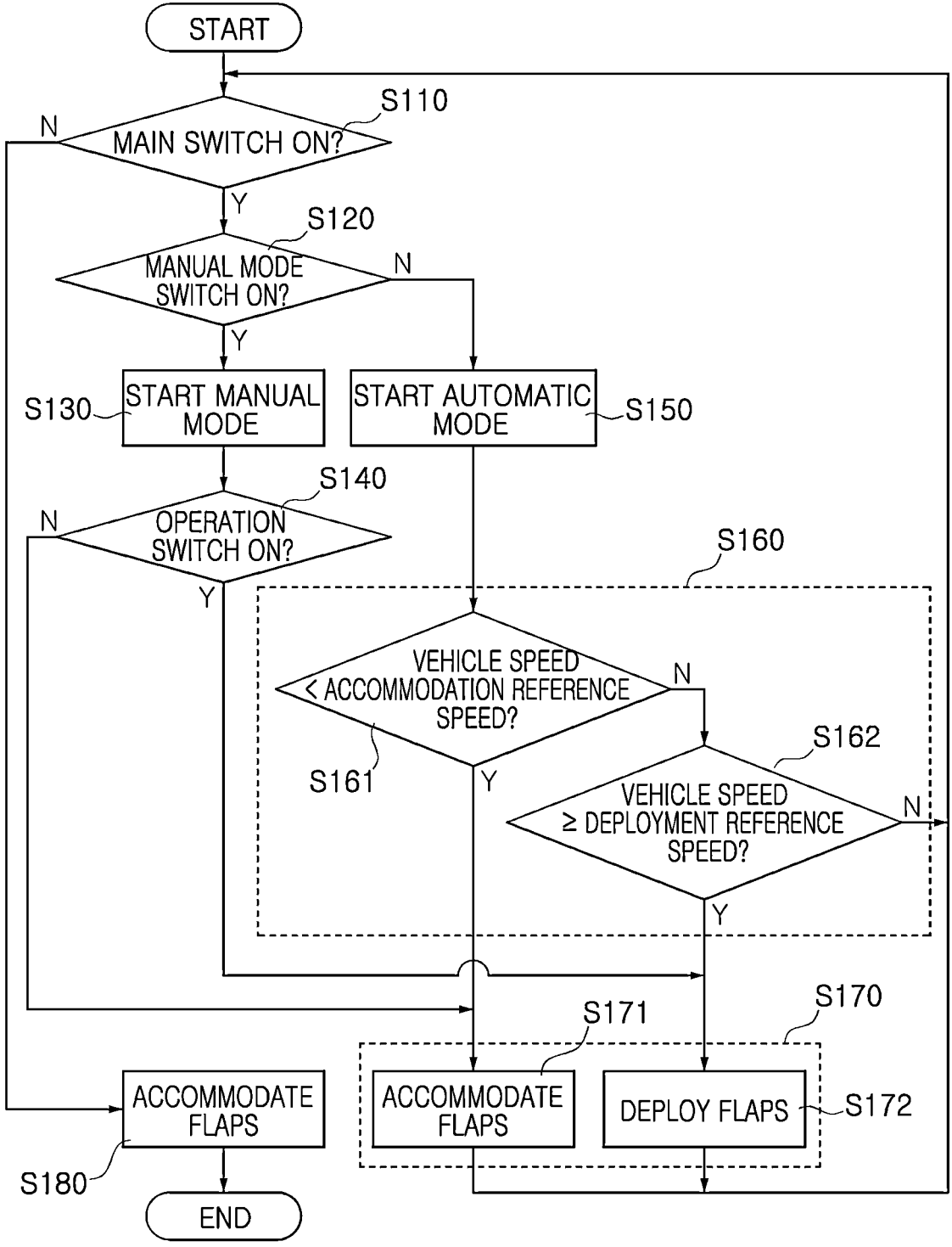
FIG. 18 is a flowchart illustrating a control method of the apparatus for improving aerodynamic performance of a vehicle according to one embodiment the present disclosure.

FIG. 18 illustrates the control method of the apparatus for improving aerodynamic performance of a vehicle according to one embodiment the present disclosure.

The control method of the apparatus for improving aerodynamic performance of a vehicle according to one embodiment the present disclosure is performed by the above-described apparatus 30 for improving aerodynamic performance of a vehicle.

In a main switch determination step S110, the control part 40 determines whether or not the main switch 51 may be turned on and thus the function of the apparatus 30 for improving aerodynamic performance of a vehicle may be activated. A driver may be required to turn on the main switch 51 in order to activate the apparatus 30 for improving aerodynamic performance of a vehicle. Thus, the control part 40 determines whether or not the driver intends to activate the function of the apparatus 30 for improving aerodynamic performance of a vehicle by determining whether or not the main switch 51 is turned on.

In a manual mode switch determination step S120, the control part 40 determines whether or not the manual mode switch 52 is in an on state. When the manual mode switch 52 is on, the driver activates the apparatus 30 for improving aerodynamic performance of a vehicle in person (i.e., manually). When the manual mode switch 52 is off, the control part 40 operates the apparatus 30 for improving aerodynamic performance of a vehicle.

First, when the manual mode switch 52 is off, automatic mode start step S150, in which the control part 40 starts control in the automatic mode, may be performed.

In the automatic mode, the control part 40 controls the first flap 33 and the second flap 34 to be deployed or accommodated depending on the vehicle speed.

In this regard, vehicle speed comparison step S160 may be performed. In the vehicle speed comparison step S160, the vehicle speed of the vehicle input to the control part 40 may be compared with a reference vehicle speed.

The vehicle speed comparison step S160 includes first vehicle speed comparison step S161 of comparing whether or not the vehicle speed is slower than the accommodation reference speed, at which the flaps 33 and 34 are set to be accommodated. The vehicle speed comparison step S160 also includes a second vehicle speed comparison step S162 of comparing whether or not the vehicle speed is faster than the deployment reference speed, at which the flaps 33 and 34 are set to be deployed.

When the vehicle speed is slower than the accommodation reference speed in the first vehicle speed comparison step S161, flap accommodation step S171 described below may be performed. When the vehicle speed is not slower than the accommodation reference speed in the first vehicle speed comparison step S161, the second vehicle speed comparison step S162 may be performed.

In addition, when the vehicle speed is faster than the deployment reference speed in the second vehicle speed comparison step S162, flap deployment step S172 may be performed. When the vehicle speed is not faster than the deployment reference speed in the second vehicle speed comparison step S162, the main switch determination step S110 may be returned to and repeated.

In addition, after the flap accommodation step S171 is performed, the main switch determination step S110 may be returned to and repeated.

In addition, in the first vehicle speed comparison step S161 and the second vehicle speed comparison step S162, the deployment reference speed may be set to be higher than the accommodation reference speed.

For example, the deployment reference speed and the accommodation reference speed may be set to 85 kilometers per hour (KPH) (approximately 53 miles per hour) and 75 KPH (approximately 47 miles per hour), respectively.

The deployment reference speed may be set to be higher than the accommodation reference speed because of hysteresis. In other words, when the deployment reference speed and the accommodation reference speed are set to the same value, the operation may be frequent. Thus, the deployment reference speed may be set to be higher than the accommodation reference speed in order to prevent frequent operation.

After the vehicle speed comparison step S160, flap control step S170, in which the control part 40 operates the first flap 33 and the second flap 34 according to the vehicle speed, may be performed.

The flap control step S170 includes flap accommodation step S171 of operating the first flap 33 and the second flap 34 to be adjacent to the bottom of the vehicle, and flap deployment step S172 of deploying the first flap 33 and the second flap 34 to cover the front portion of the wheel 11.

In addition, when the manual mode switch 52 is on in the manual mode switch determination step S120, manual mode start step S130 in which the control part 40 starts control in the manual mode may be performed.

In the manual mode, whether or not to accommodate or deploy the first flap 33 and the second flap 34 is determined by the driver instead of being determined by the control part 40. In this example, whether or not to accommodate or deploy the first flap 33 and the second flap 34 may be determined by the driver, and the control part 40 controls the actuator 36a in accordance with the determination.

In addition, the control part 40 lights the manual mode lamp 55 in the manual mode start step S130 so that the apparatus 30 for improving aerodynamic performance of a vehicle may be easily recognized as operating in the manual mode.

In operation switch determination step S140, the control part 40 determines whether or not the operation switch 53 manually controlling the operation of the first flap 33 and the second flap 34 may be on.

Depending on whether the operation switch 53 is on or off, the flap deployment step S172 or the flap accommodation step S171 may be performed. In other words, when the operation switch 53 is on, the flap deployment step S172 may be performed. When the operation switch 53 is off, the flap accommodation step S171 may be performed.

In addition, when the main switch 51 is determined to be off in the main switch determination step S110, end preparation step S180 of accommodating the first flap 33 and the second flap 34 may be performed. In the end preparation step S180, the flaps 33 and 34 may be accommodated as in the flap accommodation step S171. However, in the end preparation step S180, the flaps 33 and 34 may be accommodated on the assumption that the process has ended and no subsequent operations are to be waited for.

When a component, device, element, or the like of the present disclosure is described herein as having a purpose or performing an operation, function, or the like, the component, device, or element should be considered herein as being "configured to" meet that purpose or to perform that operation or function.

The aforementioned present disclosure is not limited by the aforementioned embodiments and the accompanying drawings, and it should be apparent to those having ordinary skill in the art that various substitutions, modifications, and changes may be made without departing the technical spirit of the present disclosure.

What is claimed is:

1. An apparatus for improving aerodynamic performance of a vehicle, the apparatus comprising:
a housing fastened to a bottom of the vehicle at a position in front of a wheel of the vehicle;
a first flap having one end hinge-connected to the housing;
a second flap, one end thereof being hinge-connected to an other end of the first flap, and an other end thereof being movable in parallel to the bottom of the vehicle; and
a drive part configured to move the other end of the second flap,
wherein in response to the operation of the drive part, the first flap and the second flap are accommodated to be in contact with the bottom surface of the vehicle or deployed to cover a front portion of the wheel, with the other end of the first flap and the one end of the second flap facing the ground.

2. The apparatus according to claim 1, further comprising a hinge assembly configured to hinge-connect the one end of the first flap to the bottom of the vehicle and hinge-connect the other end of the first flap and the one end of the second flap.

3. The apparatus according to claim 2, wherein the hinge assembly comprises:
a fixed body fixed to the housing;
a main body fastened to an upper surface of the first flap and hinge-connected to the fixed body; and
a movable body fastened to an upper surface of the second flap and hinge-connected to the main body.

4. The apparatus according to claim 3, wherein the hinge assembly further comprises:
a first hinge shaft hinge-connecting the fixed body and the main body; and
a second hinge shaft hinge-connecting the main body and the movable body, wherein when the first flap and the second flap are deployed, one end of the second hinge shaft is movable downwardly away from the housing.

5. The apparatus according to claim 4, wherein the first hinge shaft and the second hinge shaft are disposed to extend and spread out in a direction to a rear of the vehicle.

6. The apparatus according to claim 3, wherein the first flap comprises:
a first flap inner portion fastened to the main body; and
a first flap outer portion fastened to an outer surface of the first flap inner portion, the first flap outer portion extending convexly away from the first flap inner portion,
wherein the second flap comprises:
a second flap inner portion fastened to the movable body; and
a second flap outer portion fastened to an outer surface of the second flap inner portion, the second flap outer portion extending convexly away from the second flap inner portion.

7. The apparatus according to claim 1, wherein the drive part comprises:
an actuator; and
a plurality of power transmission members provided between a drive shaft of the actuator and the other end of the second flap to move the other end of the second flap in response to an operation of the actuator.

8. The apparatus according to claim 7, wherein the power transmission members comprise:
a loader having one end connected to the drive shaft of the actuator,
a coupler having one end hinge-connected to an other of the loader, and
a crank having one end hinge-connected to the housing, wherein the crank is hinge-connected to an other of the coupler and connected to the other end of the second flap.

9. The apparatus according to claim 8, further comprising a flap connector fastened to the second flap,
wherein the flap connector is fastened to the crank.

10. The apparatus according to claim 9, wherein the housing has a through-hole through which the flap connector extends.

11. The apparatus according to claim 10, further comprising a sliding cover provided between the flap connector and the crank and covering the through-hole.

12. The apparatus according to claim 1, wherein the housing is mounted on a lower portion of each of both side ends of a front end module (FEM) carrier of the vehicle through a connector bracket.

13. The apparatus according to claim 1, further comprising a control part configured to control the operation of the drive part and control the first flap and the second flap to be accommodated or deployed.

14. The apparatus according to claim 13, further comprising flap operation lamps configured to be lit when the first flap and the second flap are deployed.

15. The apparatus according to claim 13, further comprising a manual mode lamp configured to be lit when the drive part operates in a manual mode.

* * * * *